Patented Oct. 15, 1935

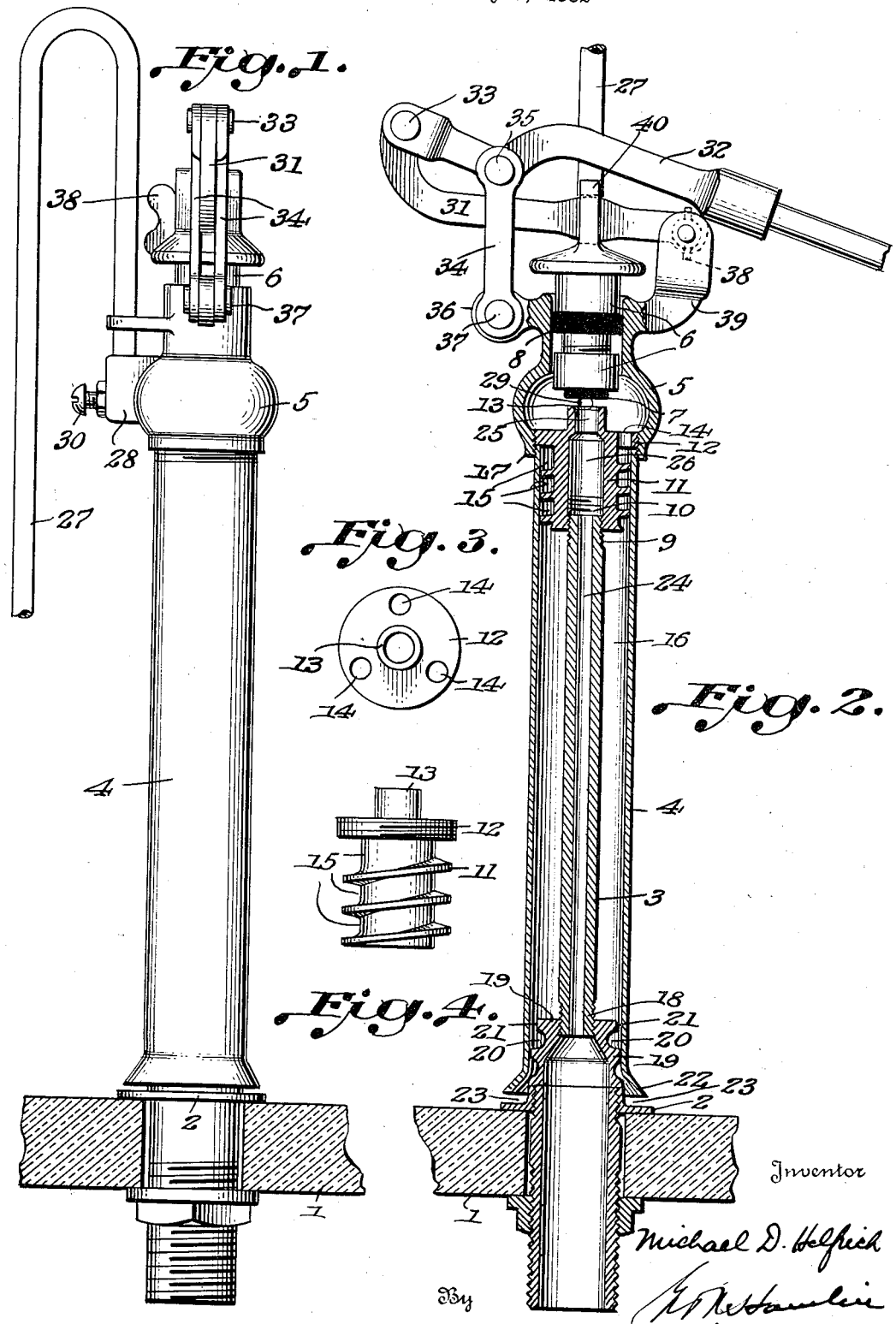

2,017,799

UNITED STATES PATENT OFFICE 2,017,799

BALL COCK

Michael D. Helfrich, Evansville, Ind.

Application July 8, 1932, Serial No. 621,488

8 Claims. (Cl. 137—104)

This invention relates to improvements in ball cocks for water closet flush tanks and, more particularly, to improved means for silencing the flow of water from the hush-tube into the tank and for silencing the usual noise due to re-sealing, and for insuring instant closing of the valve, thereby to prevent hissing, whistling, gurgling and sucking noises which are incident to the ordinary ball cocks.

A further object is to provide improved means for effecting the foregoing results which may be made at relatively small cost as compared with the cost of manufacture of earlier ball cocks whose object has been to accomplish the above-mentioned results.

Another object is to provide, in an improved construction such as outlined, means whereby all necessary adjustments or settings may be readily effected by the plumber installing the ball cock, to meet the different pressures used in different localities, thereby to enable the ball cock to effectively fulfill the purposes outlined, regardless of the water pressure prevailing at the point of installation.

My present improvements reside, first, in the improved construction comprising the supply or "stand" tube, the worm or silencer, and the ball cock body, including the relative sizes of the bore of the supply tube and the valve seat on the worm; second, the combination of the foregoing elements with the hush-tube and the water checking and cushioning means at the bottom thereof in the region of the ball cock shank.

The last-recited combination preferably partly involves a construction carried by the ball cock shank and located within the lower end of the hush-tube embodying the principle involved in the corresponding parts of my application Serial No. 529,198, filed April 10, 1931, now Patent No. 1,999,904, issued April 30, 1935. However, in respect to the first-recited improved features, the novelty involved has no counterpart in my aforesaid co-pending application and embodies improvements in regard to the worm, the seat, and the adjustment such as does not exist in earlier ball cock constructions employing water-cushioning worms, screws, or spirals.

The system of levers and links disclosed by which the ball float is co-operatively related to the valve, is that set forth in my afore-mentioned application but it will be understood that the present improvements may be used in connection with a ball valve or cock which has a different system of levers and links from those shown in the accompanying drawing and hereinafter described.

A practical embodiment of the invention is hereinafter described and is shown in the accompanying drawing, in which:

Figure 1 is a side elevation;

Fig. 2 is a vertical section taken at right angles to Fig. 1, the valve and the links and levers being in full lines;

Fig. 3 is a plan view of the worm or spiral; and

Fig. 4 is a side elevation thereof.

The bottom of the flush tank is shown at 1, the ball cock shank appears at 2 and the supply or "stand" tube is shown at 3. The hush-tube appears at 4 and the ball cock cap or body is shown at 5.

The ball cock stem 6 is provided with a washer 7 and with a packing 8.

The upper end of the supply tube 3 is screw threaded at 9 for engagement with internal screw threads 10 in the enlarged bore of the cushioning worm or spiral 11 which snugly fits the interior of the hush tube 4 and is of the one-piece construction shown in Fig. 4. The worm 11 has an externally screw threaded head 12 and is provided with a valve seat 13 on which the washer 7 normally rests to prevent the passage of water from the tube 3 into the body or cap 5.

Holes 14 extending through the head 12, permit water to flow when the valve 6 is raised, from the interior of the body or cap 5 into the space 15 formed by the spiral of the worm 11, the water circulating through this space and finally passing into the interior 16 of the hush-tube 4.

The upper end of the hush-tube is screw threaded at 17 to engage corresponding threads in the lower part of the body or cap 5. Similarly, the screw threads on the head 12 engage the threads at 17 above the upper end of the hush-tube. These screw threaded connections and the screw threads 9, 10 enable the worm 11 and the hush-tube 4 to be adjusted as desired, to regulate the water flow which issues from the bottom of the hush-tube and thus the plumber may regulate the flow according to the pressure prevailing at the point where the installation is made.

The lower end of the supply tube 3 is screwed into the shank 2 at 18, whereby the tube 3, hush-tube 4, worm 11, cap 5, valve 6, and operating links and levers are supported from the shank 2, with adaptability of adjustment of the worm and hush-tube, as previously explained.

The construction of the upper part of the shank 2 is substantially that set forth and claimed in my application Serial No. 529,198. The upper part of the shank 2 is provided with integral flanges or discs 19, of which there may be two or more. These discs or flanges are of a diameter adapting them to snugly fit the interior wall of the hush-tube 4 and they are spaced apart, as shown at 20. The respective flanges 19 have "flats" or cut away parts 21, the cut away parts on the upper flange being disposed in offset relationship to the cut away parts on the lower flange, say, at quadrants distances therefrom. In view of this construction, the water flowing down the space 16 and through the skirted or flared lower end 22 of the hush-tube 4, is first checked by the upper flange 19 and made to circulate in the upper passage 20, after passing the upper flange, before it can pass by the flattened parts 21 on the lower flange.

The water issues laterally as a sheet through the space 23.

The entry of the flanges 19 into the bottom of the hush-tube forms a rigid connection for the hush-tube 4 and minimizes danger of the hush-tube becoming displaced or deliberately bent by unauthorized persons, this construction guarding, supporting and bracing the water supply tube 3 and preventing it from becoming bent or broken off, thus overcoming what has been a serious defect in ball cocks prior to my invention set forth in my application Serial No. 529,198, wherein I have disclosed and claimed this arrangement.

An important feature of the present invention is the relationship of the size or calibre of the bore 24 of the supply tube 3 to the size or calibre or bore of the valve seat 13 and the interior port 25 thereof, as well as the chamber 26 in the worm 11. The seat 13, port 25, and chamber 26 are all larger than the bore 24. In earlier ball cocks, the bore of the supply tube has either been larger than, or of substantially the same size as, the valve seat and this has resulted in the water issuing from the valve seat with considerable noise.

By making the valve seat 13 and the port 25, 26 of greater size than the bore 24, the noise of the water issuing under the ball cock or valve 6 is so minimized or silenced that it is hardly noticeable.

Furthermore, the water issuing through the seat 13 into the chamber within the cap or body 5, forms a cushion inside of the said cap or body which opposes the descent of the valve 6 and causes the float ball to be submerged in the water in the tank more than has been the case in those earlier ball cock constructions where water has been allowed to flow away freely. This submergence of the float causes the ball cock to permit a full flow of water until the rising of the float overcomes the water pressure, whereupon the float will then rise suddenly and cause the ball cock or valve 6 to almost instantly seat on the valve seat 13, thereby eliminating the usual hissing or whistling noise common to earlier ball cocks.

The holes or ports 14 which permit the water to flow from the cap 5 into the space 15 are of such a size that the desired pressure is maintained within the cap 5 to bring about the foregoing result.

The worm 11, by causing the water to circulate in a circuitous fashion before entering the interior 16 of the hush-tube 4, combined with the checking action brought about by the flats 21 on the flanges 19, brings about a cushioning action which causes the water to flow through the space 23 in the form of a sheet-like umbrella spray instead of a solid noisy stream, thus insuring quietness of operation.

The re-seal tube 27 is entered or screwed into a lug 28 which has a port 29 (Fig. 2) communicating with the interior of the cap 5. The volume of water passing through the port 29 may be regulated by the setting of a screw 30.

With a construction of the character described, there is no noise brought about by resealing at the point of closing. This is due to the constant retarded pressure in the cap or body 5, causing a continuous flow through the re-seal tube 27 until the valve 6 closes at the proper time. It will be understood that where the flow of water is not restricted, a vacuum occurs in the re-seal tube when the ball cock is closing, which results in a gurgling or sucking noise.

As previously explained, the plumber installing the ball cock can screw the hush-tube 4 up or down and adjust the tube 3 and worm 11 before setting the ball cock in the tank, to take care of the water pressure prevailing at the point of use.

The means for operating the ball valve 6 from the float are the same as set forth in my application Serial No. 529,198 and comprise a fulcrum lever 31, a float ball lever 32 which is pivoted thereto at 33, a pair of links 34 which are pivoted at 35 to the lever 32 and to an ear 36 at 37. There is a single thumb screw 38 by which the lever 31 is detachably pivoted to a pair of ears 39 carried by the cap 5.

The lever 31 passes through a loop or open ear 40 on the valve 6.

Other operating means and a different type of ball cock or valve may be substituted for the operating means and valve herein described.

The worm 11, head 12, and valve seat 13 constitute a relatively short member which may be cast as a miniature casting, in a single piece of only about one fourth the length of worms heretofore proposed for use in connection with ball cocks. This construction results in a saving of, say, three fourths of the foundry work otherwise involved in a long worm and in the machining thereof. By employing a short worm, it is possible to obtain the cushioning water column 16, due to the special formation of the shank 2.

What I claim is:

1. In a ball cock for flush tanks, the combination with a body at the upper part thereof, said body being adapted to contain a water cushion during the refilling of the tank, of a worm having a valve seat through which water may enter said body, said worm having an outside channel and water-conduit means by which water may pass from said body to the outside channel of the worm, a float-operated valve for said valve seat, a water supply tube connected to said worm through which water may pass to said body and thence to the channel in the worm when the valve is unseated, a hush tube in whose upper part only said worm is located and through which hush-tube the water supply tube passes, there being a free cushioning water column in the hush tube below the said worm, and water exit means in the lower part of the hush tube between which and the bottom of said worm is located said water column.

2. In a ball cock for flush tanks, the combination with a body at the upper part thereof, said body being adapted to contain a water cushion during the refilling of the tank, of a worm having a valve seat through which water may enter said body, said worm having an outside channel and water-conduit means by which water may pass from said body to the outside channel of the worm, a float-operated valve for said valve seat, a water supply tube connected to said worm through which water may pass to said body and thence to the channel in the worm when the valve is unseated, a hush tube in whose upper part only said worm is located and through which hush tube the water supply tube passes, and baffling and water exit means in the lower part only of said hush tube, said hush tube containing a free water cushion extending from the said baffling and water exit means to the worm.

3. In a ball cock for flush tanks, the combination with a relatively long hush tube, of a relatively short worm in the upper part only of said hush tube, said worm having an external channel and having a valve seat, a valve for said seat, a water supply tube extending through the hush tube for supplying water to said valve seat, means for directing water passing said valve seat to the channel of said worm so that it may flow from said seat to the hush tube when the valve is opened, and water exit means for said hush tube, said hush tube containing a free water column rising from said water exit means to the lower part of said relatively short worm, the water supply tube having its upper and lower ends extending into the worm and water exit means respectively and secured thereto.

4. In a ball cock for flush tanks, the combination with a relatively long hush tube, of a relatively short worm in the upper part only of said hush tube, said worm having an external channel and having a valve seat, a valve for said seat, a water supply tube extending through the hush tube for supplying water to said valve seat, said valve seat being of larger bore than the bore of the water supply tube, means for directing water from the valve seat aforesaid to the channel thereof when the valve is opened, so that the water may pass into the hush tube after circulating between said worm and the hush tube, and water exit means for the hush tube, said hush tube being unobstructed between the water exit means and the lower part of the worm and containing a free water cushion therebetween.

5. In a ball cock for flush tanks, the combination with a relatively long hush tube, of a relatively short worm in the upper part only of said hush tube, said worm having an external channel and having a valve seat, a valve for said seat, a water supply tube extending through the hush tube for supplying water to said valve seat, means for directing water passing said valve seat to the channel of said worm so that it may flow from said seat to the hush tube when the valve is opened, water exit means for said hush tube, said hush tube containing a free water column rising from said water exit means to the lower part of said relatively short worm, and a baffling silencer located in the lower part only of the hush tube which checks and silences the discharge of the water through the water exit into the tank, the water supply tube having the upper and lower ends thereof extending into and screw-threaded with the worm and baffling silencer respectively.

6. In a ball cock for flush tanks, the combination with a body at the upper part thereof, of a relatively short worm and relatively long hush tube both of which are adjustably connected to said body, said worm having an external channel and having a valve seat, the upper part only of said hush tube enclosing said worm, the remaining part of the hush tube extending below the bottom of the worm, a valve for said seat, a water supply tube extending through the hush tube adjustably connected to the worm and adapted for supplying water to said valve seat, a water conduit being provided to direct water from the body to the channel of the worm when the valve is opened, and a baffling water exit silencer in the lower part only of said hush tube, said hush tube being adapted to contain a water column between the baffling water exit silencer and the worm, the water supply tube having the upper and lower ends thereof extending into and screw-threaded with the worm and baffling silencer respectively.

7. In a ball cock for flush tanks, the combination of a supply tube, a worm having a threaded connection with the upper end of said supply tube and supported thereby, said worm having an external flange at its upper end portion and a valve seat above the flange, which valve seat communicates with the supply tube through the worm, a body having a chamber therein surrounding the valve seat and having the lower portion thereof threaded onto the worm flange and being supported thereby, a valve for the valve seat, and a hush-tube having threaded connection with the lower portion of the body beneath the worm flange and extending downwardly therefrom around the worm and supply tube.

8. In a ball cock for flush tanks, the combination of a supply tube, a worm having an opening therethrough, the lower end of which is threaded on the supply tube and the upper end of which forms a valve seat, a valve for said seat, a body having a chamber therein surrounding the valve seat, said body having a threaded opening in the lower portion thereof, the worm having an external flange at its upper end portion threaded into the threaded body opening, and a hush-tube having the upper end thereof threaded into said threaded body opening beneath the worm flange and extending downwardly therefrom around the worm and supply tube.

MICHAEL D. HELFRICH.